United States Patent

Isono

[19]

[11] Patent Number: 5,623,405

[45] Date of Patent: Apr. 22, 1997

[54] ACCOUNTING SYSTEM AND METHOD FOR ASYNCHRONOUS TRANSFER MODE NETWORK

[75] Inventor: Osamu Isono, Kawasaki, Japan

[73] Assignee: Fujitsu Limited, Kawasaki, Japan

[21] Appl. No.: 235,136

[22] Filed: Apr. 28, 1994

Related U.S. Application Data

[63] Continuation of Ser. No. 916,261, Jul. 21, 1992, abandoned.

[30] Foreign Application Priority Data

Jul. 24, 1991 [JP] Japan .................................. 3-184282

[51] Int. Cl.$^6$ .................................................. G06F 15/00
[52] U.S. Cl. ........................ 395/230; 370/397; 379/114; 455/2
[58] Field of Search ...................... 364/401, 406, 364/464.01, 348, 7, 515; 370/13, 17, 60, 60.1, 79, 94.1, 84; 379/111, 114; 375/107; 348/1, 7, 13–15; 455/2, 3.1–3.3, 4.1, 4.2, 5.1–5.3; 358/84, 86, 122; 380/4, 5, 10

[56] References Cited

U.S. PATENT DOCUMENTS

| | | | |
|---|---|---|---|
| 4,163,254 | 7/1979 | Block et al. ........................... | 358/122 |
| 4,450,477 | 5/1984 | Lovett .................................. | 358/86 |
| 4,964,119 | 10/1990 | Endo et al. ........................... | 370/60 |
| 5,007,043 | 4/1991 | van den Dool et al. ............... | 370/60 |
| 5,007,048 | 4/1991 | Kowalk ................................. | 370/60 |
| 5,014,260 | 5/1991 | Wicklund ............................. | 370/13 |
| 5,050,213 | 9/1991 | Shear ................................... | 380/25 |
| 5,070,498 | 12/1991 | Kakuma et al. ..................... | 370/60 |
| 5,119,369 | 6/1992 | Tanabe et al. ....................... | 370/60 |
| 5,153,578 | 10/1992 | Izawa et al. ........................ | 340/825.1 |
| 5,224,092 | 6/1993 | Brandt ................................. | 370/94.1 |
| 5,247,575 | 9/1993 | Sprague et al. ..................... | 380/9 |
| 5,282,207 | 1/1994 | Jurkevich et al. .................. | 370/95.1 |

OTHER PUBLICATIONS

U.S. Ser. No. 08/119,599, Filing Date Sep. 13, 1993, Tatsuo Tachibana et al. (FWC), Fujitsu Limited.
U.S. Ser. No. 07/779,178, Oct. 18, 1991, Tatsuo Tachibana et al. (Parent), Fujitsu Limited.

*Primary Examiner*—Gail O. Hayes
*Assistant Examiner*—Frantzy Poinvil
*Attorney, Agent, or Firm*—Staas & Halsey

[57] ABSTRACT

An accounting system for an ATM network includes a first unit for detecting a VCI (Virtual Channel Identifier) in an ATM cell and information type data contained in the ATM cell. The information type data indicates the type of information contained in the ATM cell. A second unit outputs an accounting coefficient related to the information type data detected by the first unit. A third unit generates a cell arrival signal in response to arrival of each ATM cell having an identical VCI value and generates accounting data by using the accounting coefficient and the cell arrival signal.

28 Claims, 9 Drawing Sheets

5,623,405

ACCOUNTING SYSTEM AND METHOD FOR ASYNCHRONOUS TRANSFER MODE NETWORK

This application is a continuation of application Ser. No. 07/916,261, filed Jul. 21, 1992, now abandoned.

BACKGROUND OF THE INVENTION

1. Field of the Invention

The present invention generally relates to an ATM (Asynchronous Transfer Mode) network, and more particularly to an accounting system and method suitable for an ATM network.

2. Description of the Related Art

Recently, there has been considerable activity in the development of an ATM network suitable for constructing a B-ISDN (Broad-band Integrated Services Digital Network). In such an ATM network, information with a fixed length (53 octets) is transferred. Such information having a fixed length is called a cell. The ATM network is capable of transferring various types of information (media). Examples of the media transferred are digitized speech signals having low bit rates, and data having high bit rates, such as image data, facsimile data and still picture data. It is necessary to charge users for communications services provided by the ATM network.

The ATM network has not yet been practically used, and attractive accounting systems have not yet been proposed. One may consider an accounting system based on the quantity of data transferred via the ATM network.

FIG. 1 shows a part of a switch in a conventional ATM network equipped with the above accounting system. The switch shown in FIG. 1 comprises a buffer 12, a signaling device 13, a header conversion circuit 14, a cell counting circuit 15, an accounting data memory 16, a call control device 17, and a conversion table 18. A call setup procedure is carried out between calling and called terminals (not shown) and the signaling device 13. The call control device 17 determines a route directed to a destination at which the call will terminate. Cells transmitted by the calling terminal after the route is determined are successively stored in the buffer 12.

FIG. 1 shows one input cell having information and a header 10. The header 10 contains a VCI (Virtual Channel Identifier) assigned to the subscriber line (input or incoming line) via which the above call is transferred. The VCI of the input cell shown in FIG. 1 has a value of "a". The header conversion circuit 14 detects the VCI value of the input cell. Regarding the call from the terminal, the call control device 17 has assigned another VCI value to the route directed to the destination determined in the above-mentioned manner, and has written the above VCI value into the conversion table 18 provided in the header conversion circuit 14. In the example shown in FIG. 1, a VCI value "β" has been assigned to the route and has been written into the conversion table 18.

The input cell is written into the buffer 12 and the header 10 of the input cell is copied and written into the header conversion circuit 14. The header conversion circuit 14 detects the VCI value (=a), and obtains the VCI value (=β) assigned to the route by referring to the conversion table 18. In the example shown in FIG. 1, the header conversion circuit 14 accesses the conversion table 18 by the VCI value "a", and obtains the VCI value "β" assigned to the route directed to the destination. Then, the header conversion circuit 14 writes the VCI value "β" in the buffer 12.

The cell with the VCI value "β" is read from the buffer 12 and output to an output highway (outgoing line). The header conversion circuit 14 outputs a signal to the cell counting circuit 15 each time it receives the cell. The cell counting circuit 15 increases the count value for each VCI value each time the signal from the header conversion circuit 14 is received. The count value of the cell counting circuit 15 obtained for each VCI value is written into the accounting data memory 16. The charge for each VCI value can be calculated using the respective count value.

As has been described previously, various types of information are transferred via the ATM network. For example, a speech signal has a bit rate of, for example, 64 Kbps and an image signal has a bit rate of, for example, 100 Mbps. In this case, the number of cells containing image data is approximately 1000 times the number of cells containing speech data. According to the above-mentioned accounting system, the charging of money is carried out for each VCI value. Since the charging rate is determined based on one cell, in the above case, the charge for transfer of the image signal is approximately 1000 times that for transfer of the speech signal. However, this is not reasonable and practical. If the charging rate is determined based on a cell for the transfer of speech, the charge for transfer of image data is extremely expensive. On the other hand, if the charging rate is determined based on a cell for transfer of image data, the charge for transfer of speech data is extremely cheap.

SUMMARY OF THE INVENTION

It is a general object of the present invention to provide an accounting system for an ATM network in which the above disadvantages are eliminated.

A more specific object of the present invention is to provide an accounting system capable of flexibly charging users for communications services on the basis of the types of media (information type).

The above objects of the present invention are achieved by an accounting system for an ATM network comprising first means for detecting a VCI (Virtual Channel Identifier) in an ATM cell and an information type contained in the ATM cell, the information type indicating the type of information contained in the ATM cell, second means, coupled to the first means, for outputting an accounting coefficient related to the information type detected by the first means, and third means, coupled to the first and second means, for generating a cell arrival signal in response to the arrival of each ATM cell having an identical VCI value and for generating accounting data by using the accounting coefficient and the cell arrival signal.

Another object of the present invention is to provide an accounting method capable of flexibly charging users for communications services on the basis of the types of information which are transmitted.

These objects of the present invention are achieved by an accounting method for an ATM network, the accounting method comprising the steps of (a) detecting a VCI (Virtual Channel Identifier) in an ATM cell and information type data contained in the ATM cell, the information type data indicating the type of information contained in the ATM cell; (b) outputting an accounting coefficient related to the information type detected by step (a), (c) generating a cell arrival signal in response to arrival of each ATM cell having an identical VCI value; and (d) generating accounting data using the accounting coefficient and the cell arrival signal.

Yet another object of the present invention is to provide an ATM network capable of flexibly charging users for communications services on the basis of the types of information which are transmitted.

This object of the present invention is achieved by an ATM network comprising a plurality of terminals and an ATM switch selectively connecting the terminals to each other, the ATM switch comprising an accounting system, each of the terminals generating an ATM cell containing information type data indicating the type of information contained in the ATM cell, the accounting system comprising, first means for detecting a VCI (Virtual Channel Identifier) and the information type data contained in the ATM cell; second means, coupled to the first means, for outputting an accounting coefficient related to the information type detected by the first means, and third means, coupled to the first and second means, for generating a cell arrival signal in response to arrival of each ATM cell having an identical VCI value and for generating accounting data using the accounting coefficient and the cell arrival signal.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE INVENTION

Figure 2:
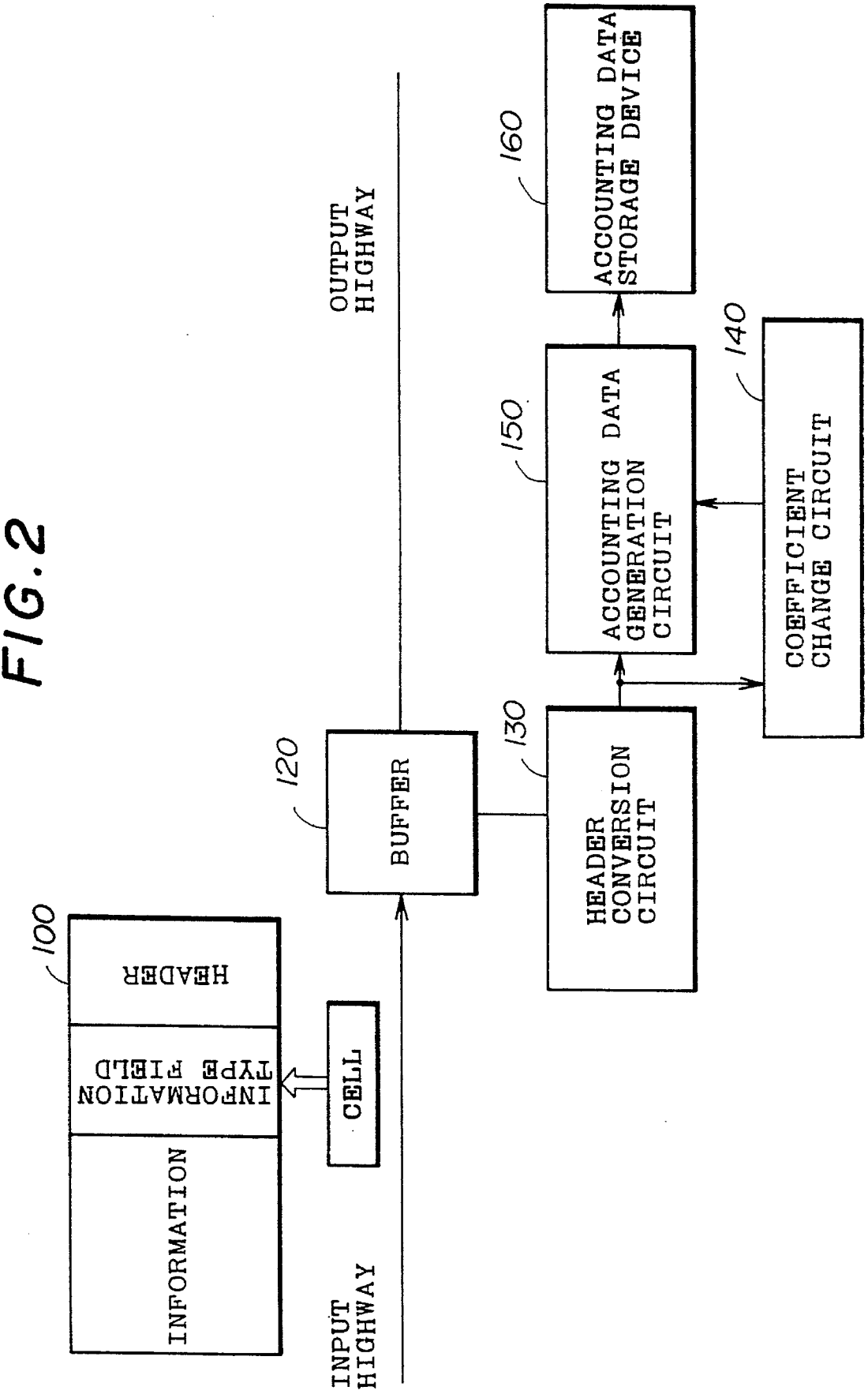
FIG. 2 is a block diagram showing an overview of the present invention.
Figure 3:
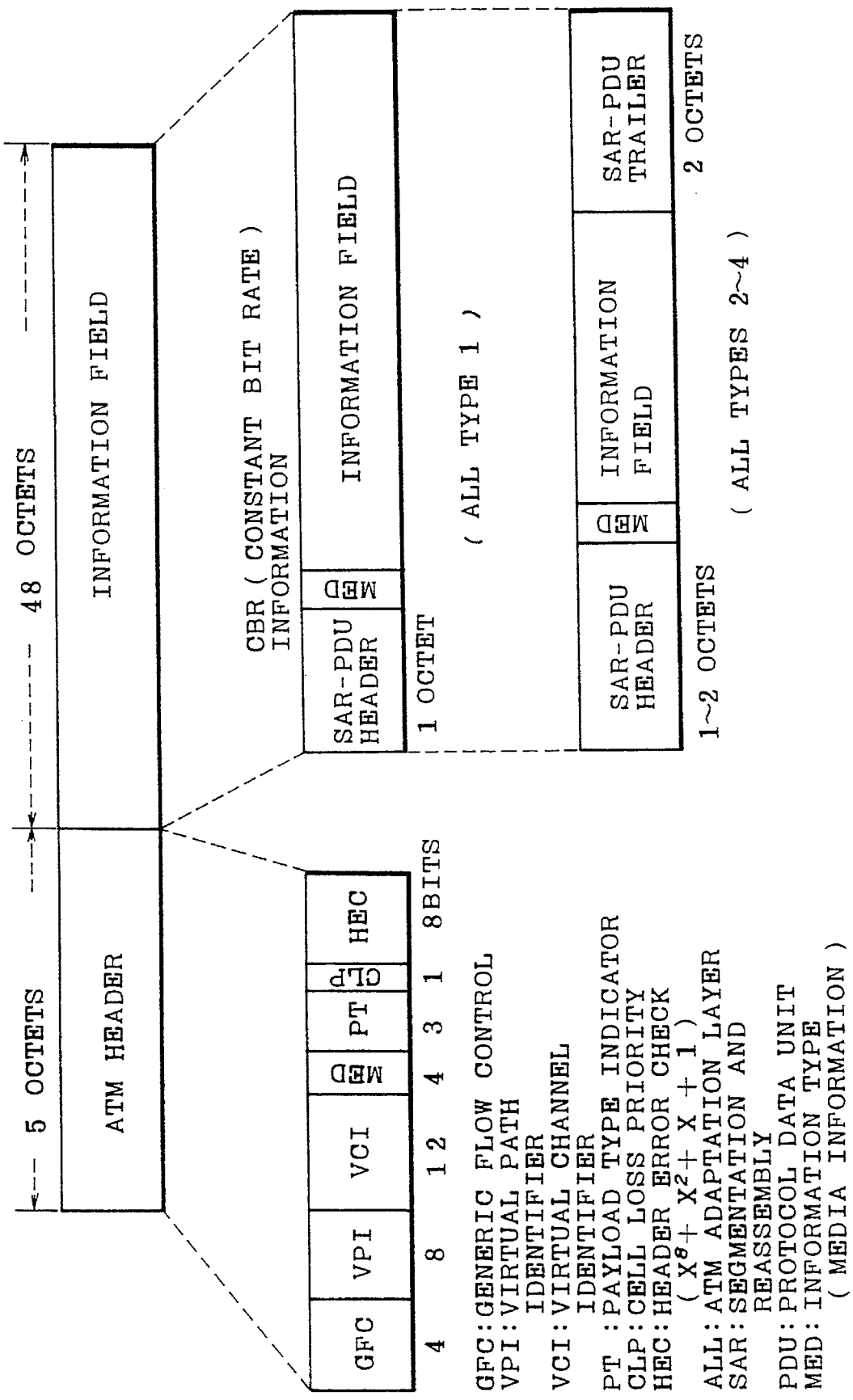
FIG. 3 is a diagram of an ATM cell format.

FIG. 2 shows an overview of an accounting system installed in an ATM switch. An accounting system according to the present invention comprises a coefficient change circuit 140, an accounting data generation circuit 150, and an accounting data storage device 160. As shown in FIG. 3, an input cell 100 shown in FIG. 2 comprises a 5-octet ATM header and a 48-octet information field in which information to be transferred is stored, as defined in the CCITT Recommendations I.361 and I.363, the disclosure of which is hereby incorporated by reference. Further, the input cell 100 comprises a media information field (also referred to as an information type field) MED, which is formed in the ATM header or in a payload field in the information field. The information type field includes data that indicates the type of information in the information field (information type data).

The information type field MED comprises of, for example, four bits.

The input cell 100 transferred via an input highway (line) is written into a buffer 120, and the ATM header thereof is applied to a header conversion circuit 130. In the case where an information type field is formed in the ATM header, the header conversion circuit 130 detects the VCI value and the information type data, and determines a VCI value of a route directed to a destination. Then, the header conversion circuit 130 outputs the VCI value of the above route and the information type data to the coefficient change circuit 140. Further, the header conversion circuit 130 outputs a cell arrival signal to the accounting data generation circuit 150. In the case where the information type field is formed in the payload field in the information field, the information type field is formed at a fixed position in the cell and the ATM header is output to the header conversion circuit 130.

The coefficient change circuit 140 stores a table in which accounting coefficients for the respective types of information are defined. The coefficient conversion circuit 140 outputs, together with the ATM header, the accounting coefficient related to the information type to the accounting data generation circuit 150. In response to receipt of the ATM header and the accounting coefficient, the accounting data generation circuit 150 generates, for the VCI value of the input cell, accounting data using the accounting coefficient. Then, the accounting coefficient is output to the accounting data storage device 160, which stores accounting data for each VCI value. It is possible to store accounting data for each VCI value for each of the information types. The accounting data generation circuit 150 generates accounting data using the accounting coefficient each time a cell arrives. Alternatively, the accounting data generation circuit 150 generates accounting data each time a predetermined number of cells related to the same VCI value is received. In this case, the accounting data is obtained by multiplying the predetermined number of cells by the related accounting coefficient.

The accounting coefficient can be obtained by, for example, dividing the bit rate of each of the information types by 48 bytes forming the information field. For example, when a speech signal has a bit rate of 64 Kbps, the accounting coefficient for the 64 Kbps speech signal is equal to 64 Kbps/48 bytes. When a data signal has a bit rate of 1.5 Mbps, the accounting coefficient for the 1.5 Mbps data signal is equal to 1.5 Mbps/48 bytes. When an image signal has a bit rate of 150 Mbps, the accounting coefficient for the 150 Mbps image signal is equal to 150 Mbps/48 bytes. Further, it is possible to use weighted accounting coefficients. Assuming that the accounting unit for speech is equal to 1 when 64 Kbps communications take place for three minutes in total (64 Kbps×3 minutes), the accounting unit for data is equal to 0.5 when 1.5 Mbps communications take place for three minutes in total, and the accounting unit for image data is equal to 2 when 150 Mbps communications take place for three minutes in total. The accounting coefficients for data and image are weighted so that the above relation can be satisfied.

Figure 4:
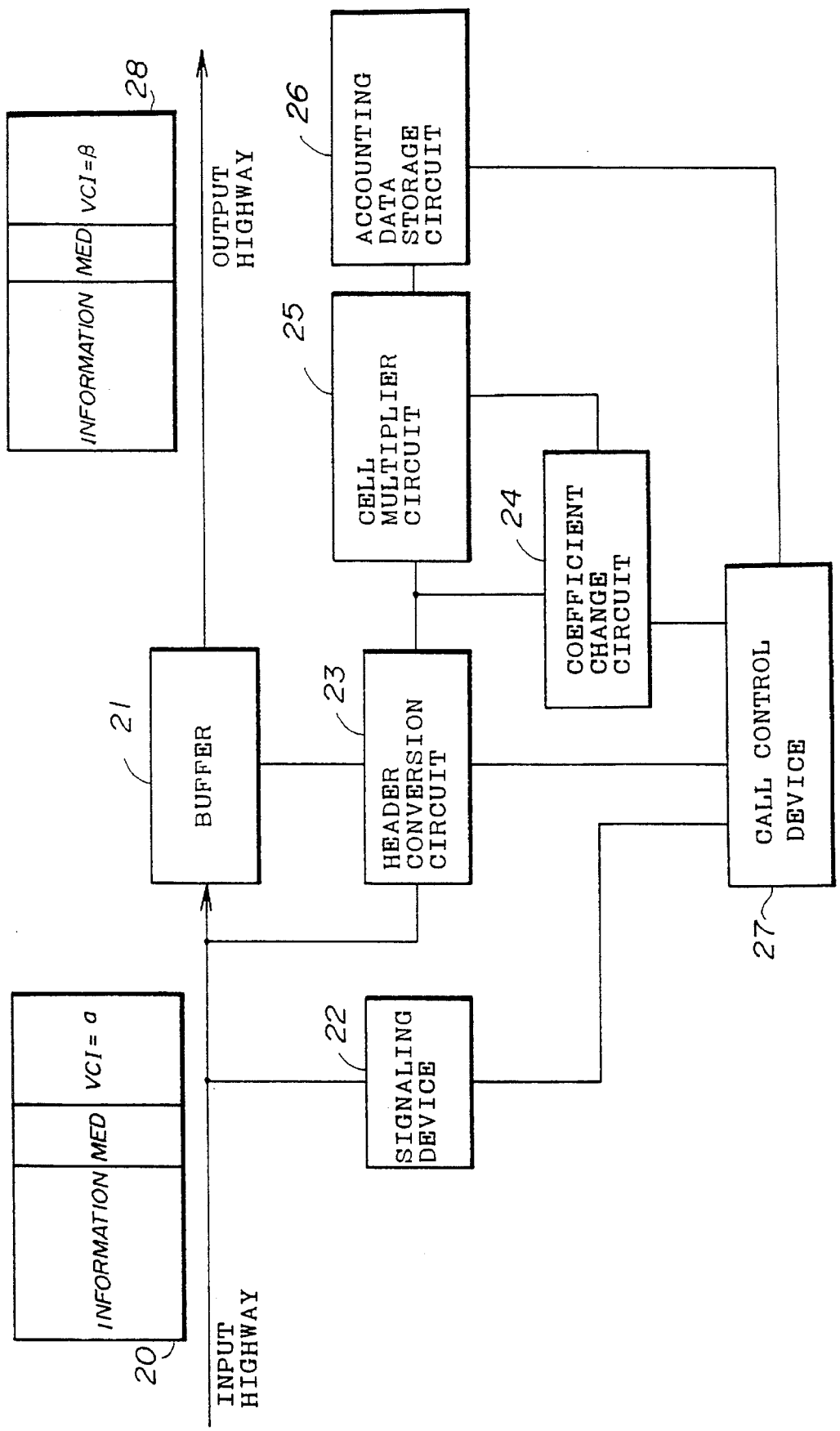
FIG. 4 is a block diagram of an embodiment of the present invention.

FIG. 4 shows an essential part of an ATM switch in which an accounting system according to an embodiment of the present invention is installed. The accounting system shown in FIG. 4 comprises a coefficient change circuit 24, a cell multiplier circuit 25 and an accounting data storage circuit 26. The ATM switch shown in FIG. 4 further comprises a buffer 21, a signaling device 22, a header conversion circuit 23, and a call control device 27.

Figure 1:
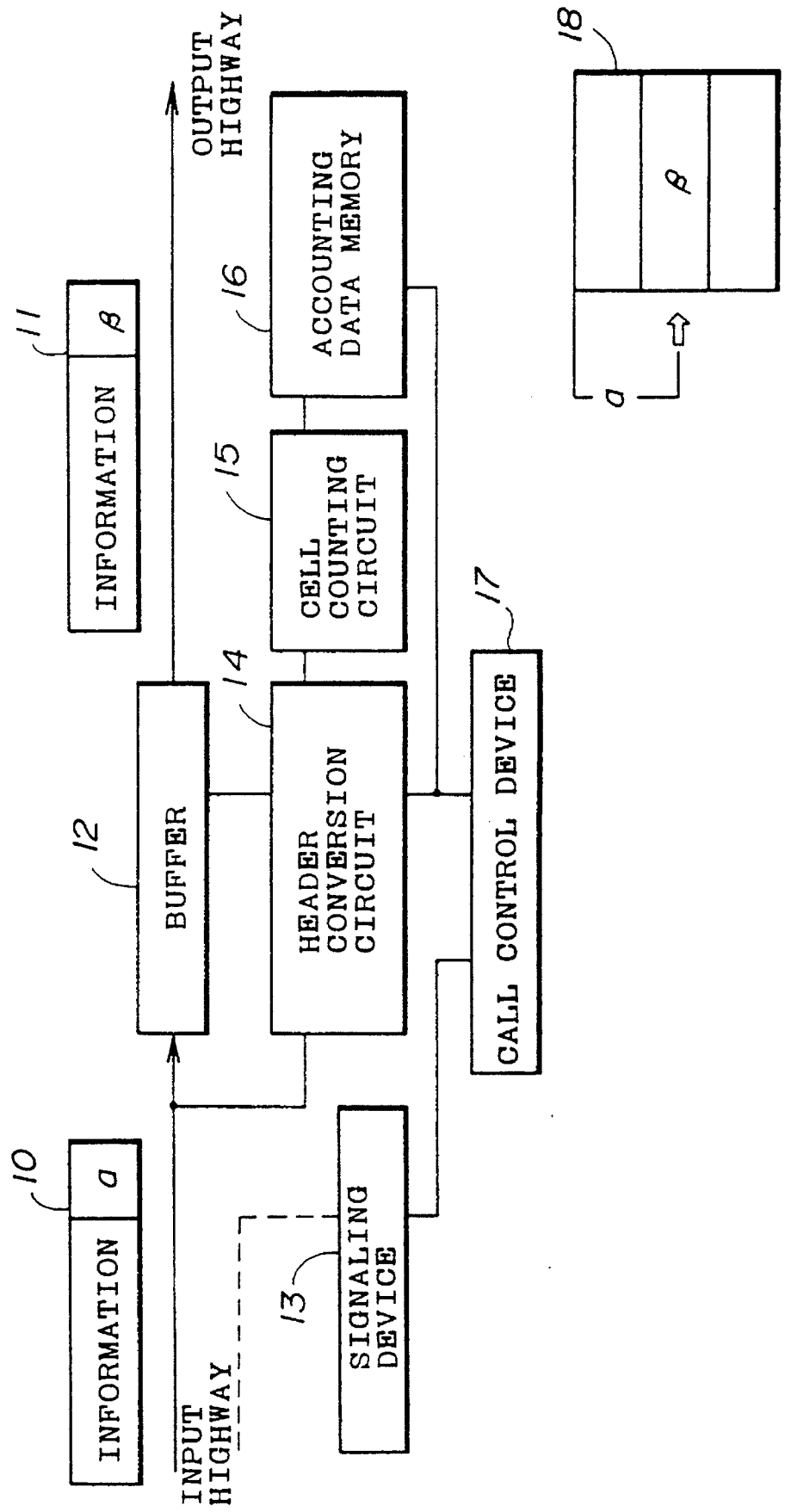
FIG. 1 is a block diagram of an ATM switch using a conventional accounting system.

The call setup information is transferred between the signaling device 22 and both the calling and the called terminals, and hence a route directed to a destination terminal is determined in the conventional manner. The header conversion circuit 23 stores a conversion memory as shown in FIG. 1. The call control device 27 writes new VCI values respectively assigned to the VCI values contained in the input cells beforehand.

An input cell 20, which has the information type (media information) field MED formed in the ATM header shown in FIG. 4, is written into the buffer 21, and the ATM header is copied and written in the header conversion circuit 23. Then, the header conversion circuit 23 detects the input VCI value contained in the input cell 20 and the information type data, and outputs the input VCI value and the information type data to the coefficient change circuit 24. Further, the header conversion circuit 23 outputs a cell arrival signal containing the input VCI value to the cell multiplier circuit 25. The coefficient change circuit 24 stores accounting coefficients defined for the respective information types, which are output by the call control device 27. For example, the accounting coefficients for transfer of speech, data, and image are equal to 1, 0.1 and 0.001, respectively. It is possible to change the accounting coefficients with respect to various factors, such as subscribers and time ranges.

The coefficient change circuit 24 outputs the accounting coefficient and the input VCI value to the cell multiplier circuit 25. If the header conversion circuit 23 generates the cell arrival signal each time one cell is received, 1 (which corresponds to the cell arrival signal and indicates one cell) is multiplied by the accounting coefficient. In this case, the accounting coefficient itself functions as accounting data. The accounting data thus generated is output to the accounting data storage circuit 26, which has a storage area assigned to the input VCI value. The accounting data is added to the integrated accounting data related to the VCI value being considered, so that the accounting data is updated. As will be described later, it is also possible for the cell multiplier circuit 25 to read the integrated accounting data from the accounting data storage circuit 26 and to add the accounting coefficient to the readout integrated accounting data. The accounting data updated in the above manner is then written into the corresponding storage area in the accounting data storage circuit 26.

If the header conversion circuit 23 generates a one-shot pulse functioning as a cell arrival signal each time a predetermined number of cells has been received, the cell multiplier circuit 25 multiplies the predetermined number of cells by the related accounting coefficient.

Figure 5:
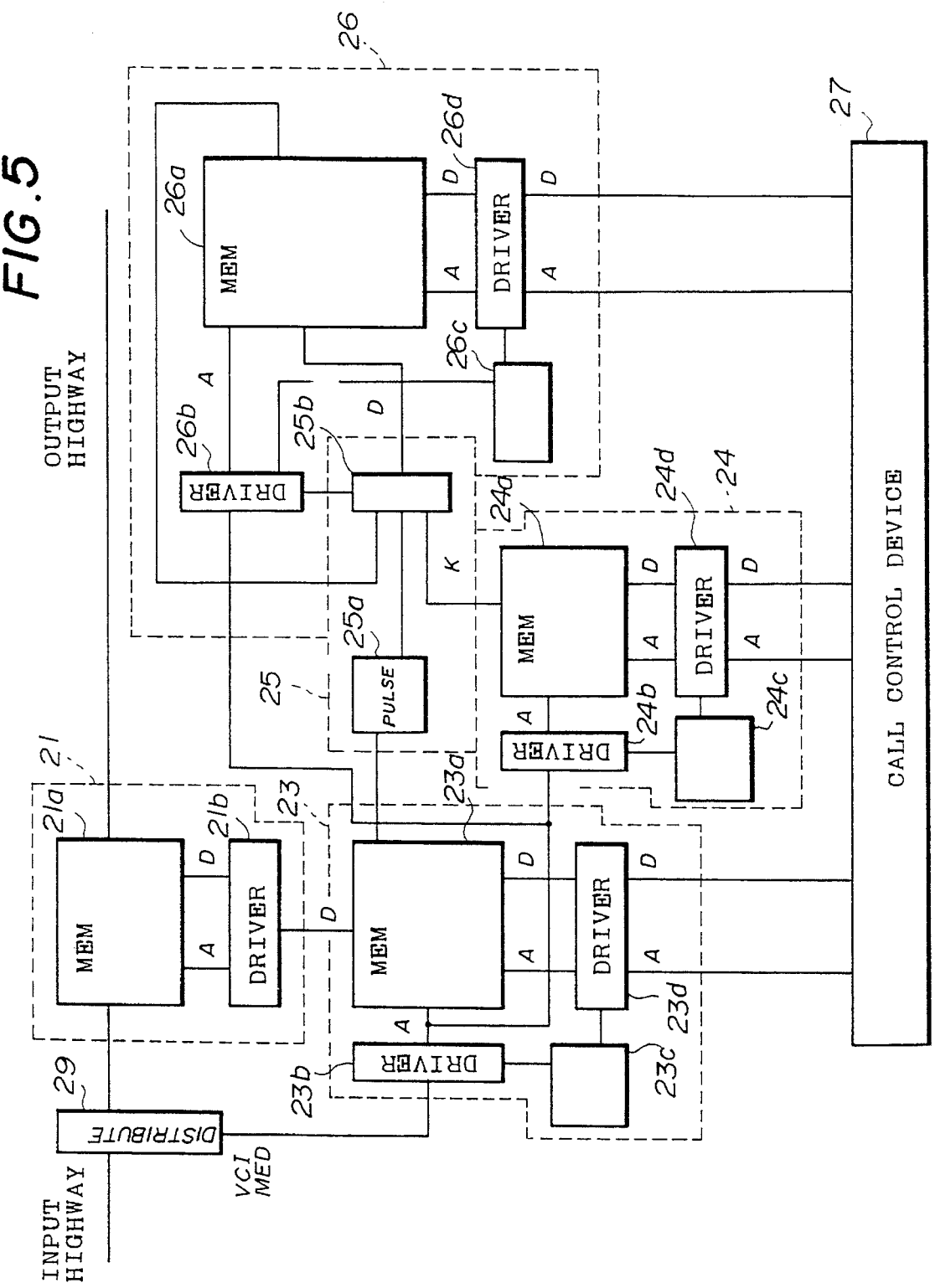
FIG. 5 is a block diagram showing the details of the configuration shown in FIG. 4.

FIG. 5 shows the details of the structure shown in FIG. 4. In FIG. 5, parts which are the same as parts shown in FIG. 4 are given the same reference numerals. A distribution circuit 29 is provided as shown in FIG. 5. The distribution circuit 29 allows the input cell to be transferred to the buffer 21, and outputs the VCI value and the information type MED to the header conversion circuit 23. In FIG. 5, a line indicated by "A" denotes an address bus, and a line indicated by "D" denotes a data bus. The buffer 21 comprises a memory (MEM) 21a and a driver 21b. An address signal generated by the driver 21b is applied to the memory 21a via the address bus A. The new VCI value of the route determined by the header conversion circuit 23 is applied to the memory 21a via the data bus D between the header conversion circuit 23 and the driver 21b and the data bus D between the driver 21b and the memory 21a.

The header conversion circuit 23 comprises a memory (MEM) 23a, a driver 23b, an arbitration circuit 23c, and a driver 23d. The driver 23b receives the input VCI value from the distribution circuit 29 and outputs it to the memory 23a via the address bus A. The driver 23d receives an address signal and a VCI value related to an input VCI value via the address and data buses A and D from the call control device 27, respectively, and writes the VCI value into a storage area of the memory 23a specified by the address. In this manner, the VCI values of routes with respect to the respective input VCI values are written into the memory 23a. The arbitration circuit 23c prevents the drivers 23b and 23d from concurrently accessing the memory 23a.

The coefficient change circuit 24 comprises a memory (MEM) 24a, a driver 24b, an arbitration circuit 24c and a driver 24d. The driver 24d receives an address signal and an accounting coefficient via the address and data buses A and D from the call control device 27, respectively, and writes the accounting coefficient into a storage area of the memory 24a specified by the address signal. In this manner, all the accounting coefficients related to the respective information types are written into the memory 24a. The driver 24b receives the information type data MED transferred via the driver 23b, and reads the accounting coefficient related to the received information type data MED. The readout accounting coefficient, labeled K, is then applied to the cell multiplier circuit 25. The arbitration circuit 24c prevents the drivers 24b and 24d from concurrently accessing the memory 24a.

The cell multiplier circuit 25 comprises a pulse generator 25a, and an operation unit 25b including an adder. The pulse generator 25a generates the cell arrival signal each time it receives a pulse signal from the memory 23a. This pulse signal is generated each time the VCI value is read from the memory 23a. The operation unit 25b multiplies 1 (the pulse signal) by the accounting coefficient K, and adds the multiplication result to the integrated accounting data read from the accounting data storage circuit 26. The result of this addition is written into the accounting data storage circuit 26.

The accounting data storage circuit 26 comprises a memory 26a, a driver 26b, an arbitration circuit 26c and a driver 26d. The driver unit 26b receives the input VCI value via the driver 23b and accesses the memory 26a using the input VCI value. The integrated accounting data stored in a storage area specified by the input VCI value is read therefrom and applied to the operation unit 25b. The updated integrated accounting data from the operation unit 25b is written into the same storage area specified by the input VCI value. The call control device 27 outputs an address signal via the driver 26d, and reads the accounting data from the storage area specified by the address signal.

Figure 6:
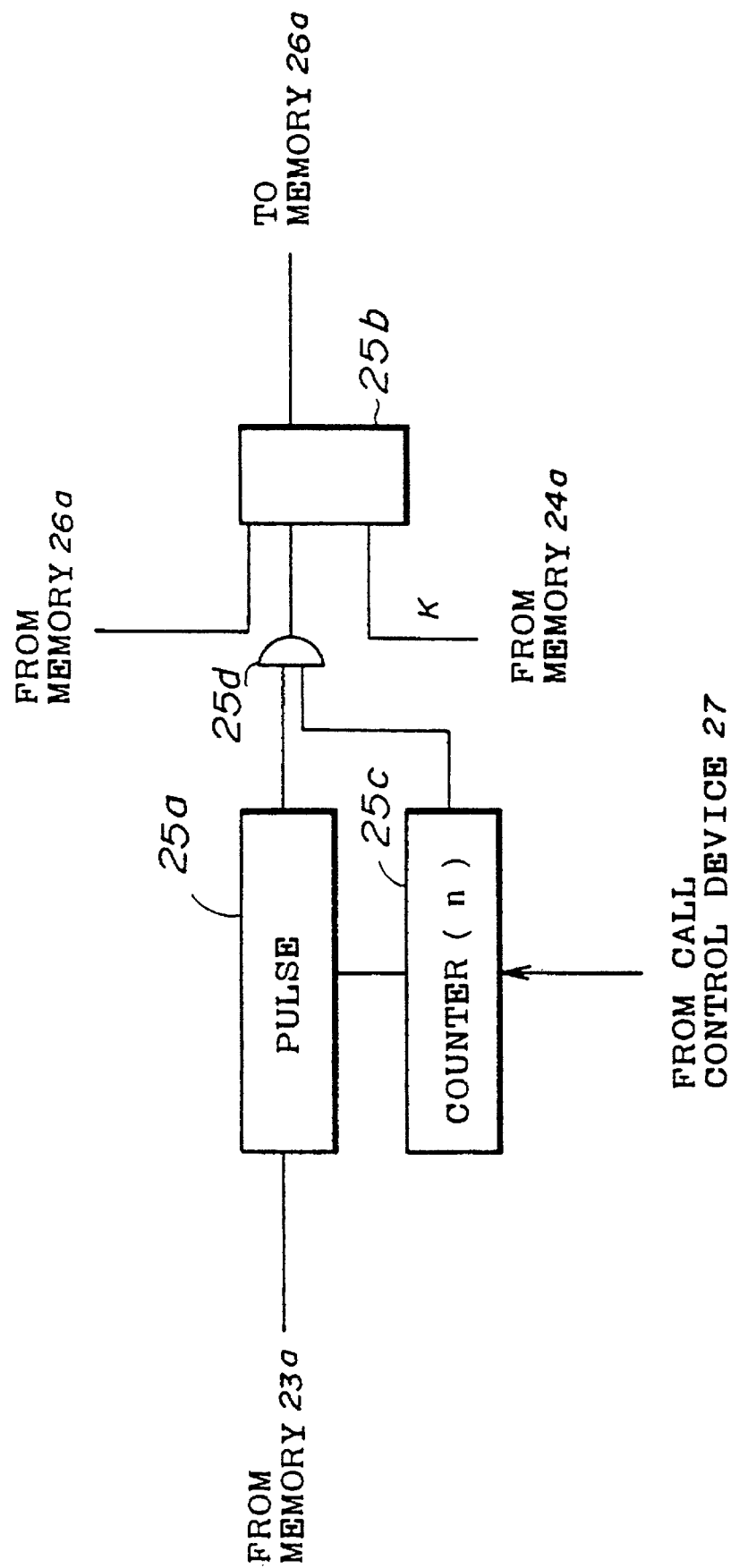
FIG. 6 is a block diagram showing an alternative configuration of a cell multiplier circuit shown in FIG. 5.

It is also possible to use the cell multiplier circuit 25 configured as shown in FIG. 6. A counter 25c and an AND gate 25d are added to the configuration of the cell multiplier circuit 25 shown in FIG. 5. The call control device 27 writes a predetermined number n of cells into the counter 25c. The counter 25c changes its counter value each time the pulse signal from the pulse circuit 25a is applied to the counter 25c. When the counter 25c counts the predetermined number n of cells, it outputs a signal to the AND gate 25d. At this time, the pulse signal generated by the cell multiplier circuit 25 passes through the AND gate 25d. In this manner, the pulse signal is applied to the operation circuit 25b each time the number n of cells is received. The operation circuit 25b multiplies the number of pulses indicated by the pulse signal by the accounting coefficient, and adds the result of this multiplication to the readout accounting data.

Figure 7:
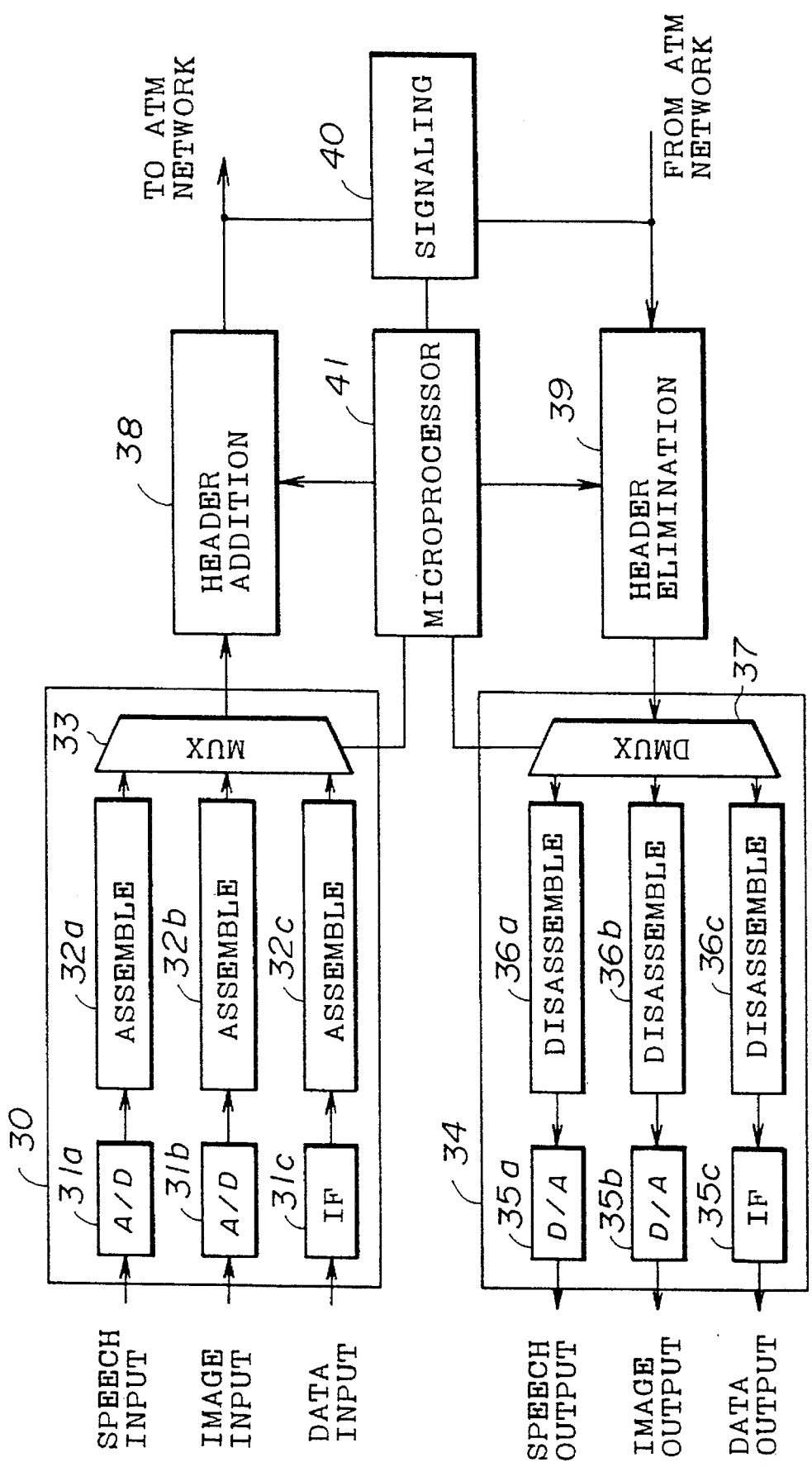
FIG. 7 is a diagram of a terminal coupled to an ATM switch.

FIG. 7 is a block diagram of a terminal in the ATM network. The terminal shown in FIG. 7 has the function of transmitting speech, data and image signals as well as that of receiving these signals. The terminal shown in FIG. 7 comprises a transmitter unit 30, a receiver unit 34, an ATM header addition circuit 38, a header eliminating circuit 39, a signaling device 40, and a microprocessor 41. The transmitter unit 30 comprises A/D converters 31a and 31b, an interface (IF) circuit 31c, cell assembling circuits 32a, 32b and 32c, and a multiplexer 33. The A/D converter 31a converts an analog speech signal from a microphone (not shown) into a digital signal. The A/D converter 31b converts an analog image signal from, for example, a camera into a digital signal. The IF circuit 31c converts an analog data signal from, for example, a keyboard into a digital signal. The cell assembling circuits 32a, 32b and 32c assemble 48-byte cells from the respective digital signals. The mutiplexer 33 selects one of the 48-byte cells from the cell assembling circuits 32a–32c, and outputs the selected 48-byte cell to the ATM header addition circuit 38. The ATM header addition circuit 38 adds the 5-byte ATM header having a VCI value to the 48-byte cell, and outputs a 53-octet ATM cell. The signaling device 40 sends control signals to the ATM network and receives control signals from the ATM network in order to execute the call setup procedure and other procedures.

The ATM header eliminating circuit 39 eliminates the ATM headers from cells received from the ATM network. The receiver unit 34 comprises a demultiplexer 37, cell disassembling circuits 36a, 36b and 36c, and D/A converters 35a and 35b and an interface circuit (IF) 35c. The demultiplexer 37 distributes the cells to the cell disassembling circuits 36a, 36b and 36c. The cell disassembling circuits 36a, 36b and 36c disassemble the cells to generate the original digital signals, which are converted into the original analog signals by means of the D/A converters 35a, 35b and 35c, respectively. The D/A converter 35a generates the original speech signal, and the D/A converter 35b generates the original image signal. Further, the interface circuit 35c generates the original data signal. The microprocessor 41 controls the entire operation of the terminal.

A description will now be given of the operation of the terminal shown in FIG. 7 related to the accounting system according to the present invention. The signaling device 40 communicates with the ATM network using predetermined control signals, so that a call from the terminal is accepted by the ATM network and a VCI value (together with a VPI (Virtual Path Identifier) value) is determined. If the terminal has a request for transfer of speech and image, analog speech and image signals are converted into digital speech and image signals by means of the A/D converters 31a and 31b, respectively. Then, the cell assembling circuit 32a assembles cells containing speech information, and the cell assembling circuit 32b assembles cells containing image information. These cells are stored in a buffer built in the multiplexer 33, and read therefrom with a ratio dependent on how frequently speech and image signals are respectively generated. The microprocessor 41 is notified of data showing the type of the signal selected. The microprocessor 41 understands the type of information output from the multiplexer 33. Then, the microprocessor 41 outputs VPI/VCI information and data indicating the information type to be written into the information type field MED. The header addition circuit 38 adds the above information from the microprocessor 41 to the cell being considered. Then, the cell, with the ATM header added thereto, is sent to the ATM network.

Figure 8:
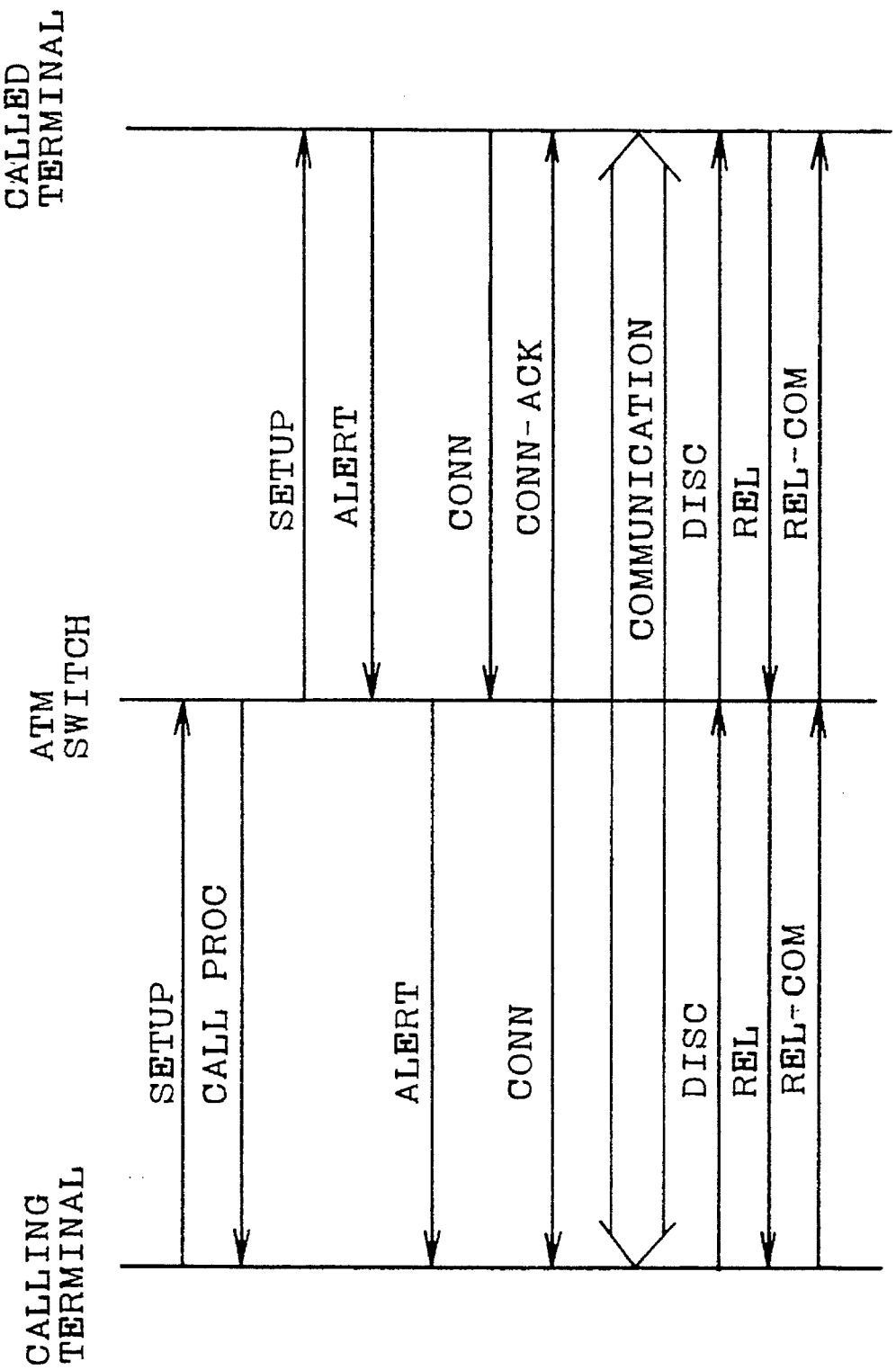
FIG. 8 is a diagram showing a sequence of a transfer of signals.
Figure 9:
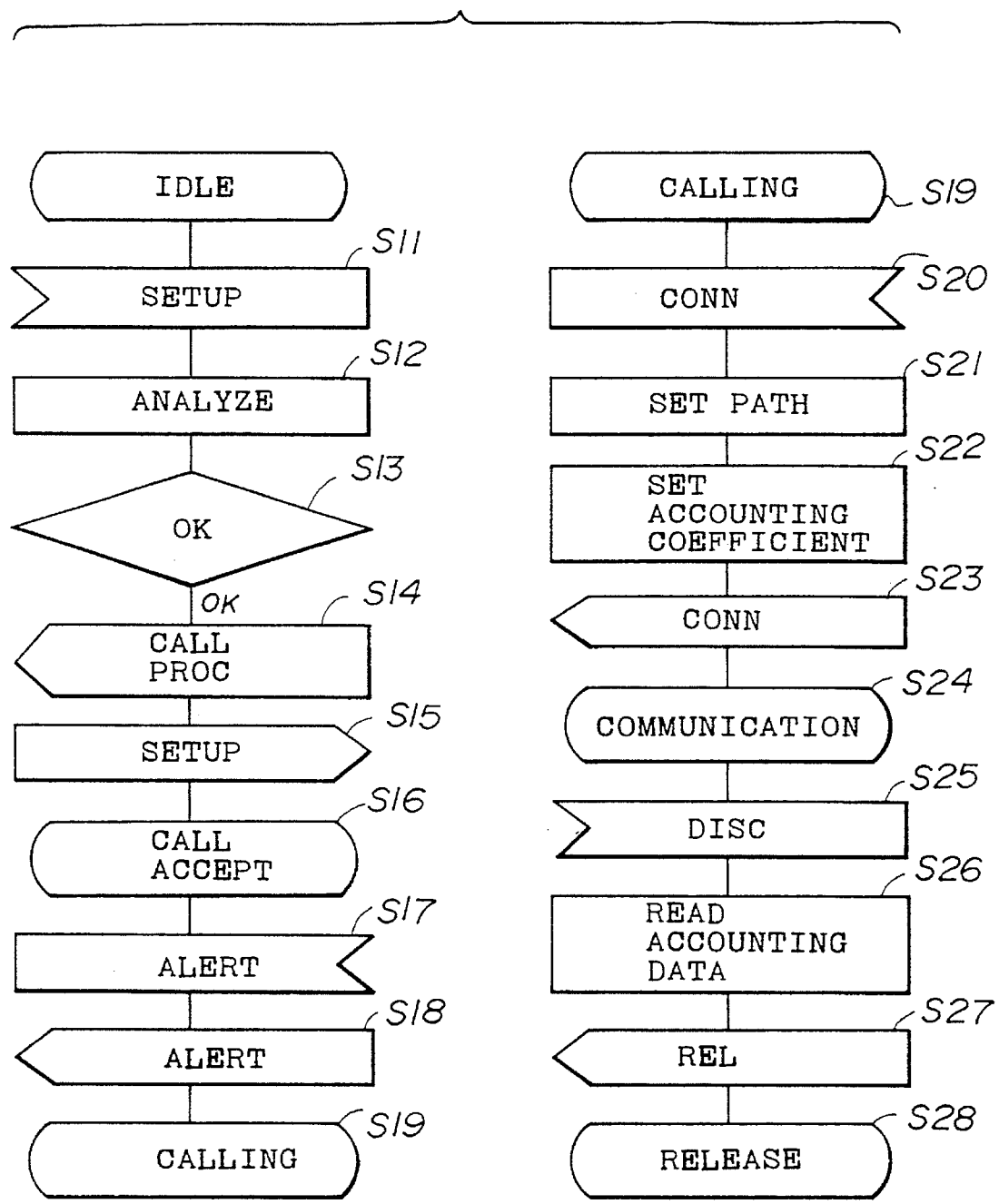
FIG. 9 is a flowchart of a process for realizing the sequence shown in FIG. 8.

FIG. 8 shows a sequence of transfer of signals among calling and called terminals and the ATM switch, and FIG. 9 is a flowchart of a process for realizing the above sequence by means of an ATM switch. The calling terminal sends a call setup message SETUP to the ATM switch (step S11). The ATM switch analyzes the call setup message SETUP (step S12), and determines whether or not there is a problem (step S13). When it is determined that there is no problem, the ATM switch sends back a call proceeding message CALL PROC (step S14). Then, the ATM switch sends a call setup message SETUP to the called terminal (step S15). The called terminal accepts the call setup message SETUP (step S16), and sends back an alerting message ALERT to the ATM switch (step S17). Then, the ATM network sends an alerting message ALERT to the calling terminal (step S18). Then, the called terminal is called (step S19). In response to an offhooking operation in the called terminal, the called terminal sends a connect message CONN to the ATM switch (step S20). In response to receipt of the connect message CONN, the ATM switch determines a path (route) connecting the calling terminal and the called terminal in the aforementioned manner (step S21), and determines the accounting coefficient value in the aforementioned manner (step S22). Thereafter, the ATM switch sends a connect acknowledgement message CONN-ACK to the called station and sends a connect signal CONN to the calling terminal (step S23). During communications, the aforementioned accounting operation is carried out. Then, the calling terminal and the called terminal can communicate with each other (step S24). When the communications are terminated, the calling terminal sends a disconnect message DISC to the ATM switch (step S25), and the ATM switch sends a disconnect message DISC to the called terminal. Then, the accounting data is read from the accounting data storage device 26 under the control of the call control device 27 (step S26). The called terminal sends a release message REL to the ATM switch, and the ATM switch sends a release message REL to the calling terminal (step S27). Then, the path is released and disconnected (step S28).

The present invention is not limited to the specifically disclosed embodiments, and variations and modifications may be made without departing from the scope of the present invention.

What is claimed is:

1. An accounting system for an asynchronous transfer mode (ATM) network carrying asynchronous transfer mode (ATM) cells from a transmitting terminal to a receiving terminal, said accounting system comprising:

first means for receiving said ATM cells carried by the ATM network, each of said ATM cells having a virtual channel identifier (VCI) field with a VCI value indicative of a route to the receiving terminal, a first field and a second field, the first field having information, the second field having information type data indicative of a medium type of the information, said first means detecting the respective VCI value and the respective information type data contained in each said received ATM cell and generating a cell received signal each time said first means receives one of said ATM cells;

second means, coupled to said first means, for outputting an accounting coefficient indicative of an accounting rate associated with each respective said received ATM cell based upon the respective information type data detected by said first means; and third means, coupled to said first and second means, for generating accounting data for each said ATM cell based upon the respective accounting coefficient and cell received signal and storing said accounting data based upon each said VCI value detected by said first means.

2. The accounting system as claimed in claim 1, wherein said third means further comprises means for generating a sum of said accounting data associated with respective ATM cells having the same VCI value as one another for each said VCI value detected by said first means.

3. The accounting system as claimed in claim 1, wherein said second means further comprises:

memory means for storing a plurality of accounting coefficients respectively corresponding to types of the information to be transferred through the ATM network; and access means, coupled to said first means and said memory means, for accessing said memory means based upon said information type data detected by said first means so that one of said plurality of accounting coefficients associated with said information type data detected by said first means is output to said third means.

4. The accounting system as claimed in claim 1, wherein said third means further comprises fourth means for storing the accounting data obtained for each said received ATM cell in addresses associated with respective VCI values.

5. The accounting system as claimed in claim 1, wherein said first means further comprises fourth means for detecting the information type data contained in an ATM header of each respective said ATM cell.

6. The accounting system as claimed in claim 1, wherein said first means further comprises fourth means for detecting the information type data contained in an information field in a payload field of each respective said ATM cell.

7. The accounting system as claimed in claim 1, wherein said third means further comprises summing means for generating a sum of the stored, corresponding accounting data for respective, received cells having a common control data value.

8. An accounting system for an asynchronous transfer mode (ATM) network carrying asynchronous transfer mode (ATM) cells from a transmitting terminal to a receiving terminal, said accounting system comprising:

first means for receiving said ATM cells carried by the ATM network, each of said ATM cells having a virtual channel identifier (VCI) field with a VCI value indicative of a route to the receiving terminal, a first field and a second field, the first field having information, the second field having information type data indicative of a type of the information, said first means detecting the respective VCI value and the respective information type data contained in each said received ATM cell and generating a cell received signal each time said first means receives one of said ATM cells;

second means, coupled to said first means, for outputting an accounting coefficient indicative of an accounting rate associated with each respective said received ATM cell based upon the respective information type data detected by said first means; and third means, coupled to said first and second means, for generating accounting data for each said ATM cell based upon the respective accounting coefficient and cell received signal and storing said accounting data based upon each said VCI value detected by said first means, wherein each said accounting coefficient is based on a number of bytes of the information in an information field of each respective said ATM cell and a bit rate of said information in the information field of each respective said ATM cell.

9. An asynchronous transfer mode (ATM) network comprising:

a plurality of terminals;

an asynchronous transfer mode (ATM) switch selectively connecting said terminals to each other through the ATM network and further comprising an accounting system;

each of said terminals generating asynchronous transfer mode (ATM) cells, each said ATM cell containing a virtual channel identifier (VCI) field with a VCI value indicative of a route to one of said plurality of terminals, a first field and a second field, the first field having information, the second field having information type data indicative of a medium type of said information contained in said ATM cell; and said accounting system comprising:

first means for receiving said ATM cells carried by the ATM network, detecting said respective VCI value contained in the virtual channel identifier field and said respective information type data contained in the second field and generating a cell received signal each time said first means receives one of said ATM cells, second means, coupled to said first means, for outputting an accounting coefficient indicative of an accounting rate associated with each respective said received ATM cell based upon the respective information type data detected by said first means; and third means, coupled to said first and second means, for generating accounting data for each said ATM cell based upon the respective accounting coefficient and said cell received signal and storing said accounting data based upon each said VCI value detected by said first means.

10. The ATM network as claimed in claim 9, wherein said third means further comprises means for generating a sum of said accounting data associated with respective ATM cells having the same VCI value as one another for each said VCI value detected by said first means.

11. The ATM network as claimed in claim 9, wherein said second means further comprises:

memory means for storing a plurality of accounting coefficients respectively corresponding to types of the information to be transferred through the ATM network; and access means, coupled to said first means and said memory means, for accessing said memory means based upon said information type data detected by said first means so that one of said plurality of accounting coefficients associated with said information type data detected by said first means is output to said third means.

12. The ATM network as claimed in claim 9, wherein said third means further comprises fourth means for storing the accounting data obtained for each said received ATM cell in addresses associated with respective VCI values.

13. The ATM network as claimed in claim 9, wherein said first means further comprises fourth means for detecting the information type data contained in an ATM header of each respective said ATM cell.

14. The ATM network as claimed in claim 9, wherein said first means further comprises fourth means for detecting the information type data contained in an information field in a payload field of each respective said ATM cell.

15. An asynchronous transfer mode (ATM) network comprising:

a plurality of terminals;

an asynchronous transfer mode (ATM) switch selectively connecting said terminals to each other through the ATM network and further comprising an accounting system;

each of said terminals generating asynchronous transfer mode (ATM) cell, each said ATM cell containing a virtual channel identifier (VCI) with a VCI value indicative of a route to one of said plurality of terminals, information and information type data indicative of a type of said information contained in said ATM cell; and said accounting system comprising:
 first means for receiving said ATM cells carried by the ATM network, detecting said respective VCI and said respective information type data contained in each said received ATM cell and generating a cell received signal each time said first means receives one of said ATM cells,
 second means, coupled to said first means, for outputting an accounting coefficient indicative of an accounting rate associated with each respective said received ATM cell based upon the respective information type data detected by said first means; and
 third means, coupled to said first and second means, for generating accounting data for each said ATM cell based upon the respective accounting coefficient and said cell received signal and storing said accounting data based upon each said VCI value detected by said first means, wherein said third means comprises
 fourth means for generating a pulse signal each time said first means receives a predetermined number of successive ATM cells having the same VCI value as one another,
 fifth means, coupled to said fourth means, for multiplying said predetermined number of successive ATM cells by said accounting coefficient associated with said successive ATM cells upon receipt of each said pulse signal and, in response, generating corresponding multiplication signals, and
 sixth means, coupled to said fifth means, for generating a sum of said multiplication signals associated with said successive ATM cells having the same VCI value as one another for each said VCI value detected by said first means.

16. An asynchronous transfer mode (ATM) network comprising:

a plurality of terminals;

an asynchronous transfer mode (ATM) switch selectively connecting said terminals to each other through the ATM network and further comprising an accounting system;

each of said terminals generating asynchronous transfer mode (ATM) cells, each said ATM cell containing a virtual channel identifier (VCI) field with a VCI value indicative of a route to one of said plurality of terminals, a first field and a second field, the first field having information, the second field having information type data indicative of a type of said information contained in said ATM cell; and said accounting system comprising:
 first means for receiving said ATM cells carried by the ATM network, detecting said respective VCI value contained in the virtual channel identifier field and said respective information type data contained in the second field and generating a cell received signal each time said first means receives one of said ATM cells,
 second means, coupled to said first means, for outputting an accounting coefficient indicative of an accounting rate associated with each respective said received ATM cell based upon the respective information type data detected by said first means; and
 third means, coupled to said first and second means, for generating accounting data for each said ATM cell based upon the respective accounting coefficient and said cell received signal and storing said accounting data based upon each said VCI value detected by said first means, wherein each said accounting coefficient is based on a number of bytes of the information contained in the first field of each respective said ATM cell and a bit rate of said information contained in the first field of each respective said ATM cell.

17. An accounting method for an asynchronous transfer mode (ATM) network carrying cells, each cell having a virtual control identifier field, a first field and a second field, said accounting method comprising the steps of:

(a) detecting a virtual control identifier (VCI) value indicative of a route to a receiving terminal contained in the virtual channel identifier field and information type data contained in the second field, said information type data indicating a medium type of information contained in the first field;

(b) outputting an accounting coefficient indicating an accounting rate associated with each cell based upon the information type data detected by said step (a) for each cell;

(c) generating a cell received signal in response to receipt of each cell; and (d) generating accounting data for each cell based upon the respective accounting coefficient and associated cell received signal.

18. The accounting method as claimed in claim 17, further comprising the step of generating a sum of said accounting data associated with respective ATM cells having the same VCI value as one another for each said detected VCI value.

19. The accounting method as claimed in claim 17, further comprising the steps of:

generating a pulse signal each time a predetermined number of successive ATM cells having the same VCI value as one another is received;

multiplying said predetermined number of successive ATM cells by said accounting coefficient upon receipt of each said pulse signal and, in response, generating corresponding multiplication signals; and generating a sum of said multiplication signals associated with said successive ATM cells having the same VCI value as one another for each detected VCI value.

20. An accounting system for an asynchronous transfer mode (ATM) network, said ATM network carrying asynchronous transfer mode (ATM) cells over a selected one of plural routes from a transmitting terminal to a receiving terminal and the ATM cells containing, respectively and selectively, plural, different types of information, the accounting system comprising:

first means for receiving the ATM cells carried by the ATM network and generating a cell received signal corresponding to each said received ATM cell, each received ATM cell having a virtual channel identifier (VCI) field, a first field and a second field, the VCI field having an associated VCI value indicative of the selected route over which the received ATM cell has been carried by the ATM network to the receiving terminal, the first field having information, the second field having information type data indicative of a medium type of information contained therein, and the first means, further, detecting from each received ATM cell the respective VCI value and the respective information type data;

second means for storing a plurality of accounting coefficients, respectively corresponding to the plural, different types of information, the second means being coupled to the first means and responsive to the information type data detected by the first means, for each received ATM cell, for outputting the respectively corresponding accounting coefficient; and third means, coupled to said first and second means and responsive to the cell received signal, the detected VCI value and the accounting coefficient, as respectively output thereby for each received ATM cell, for generating corresponding accounting data for, and storing the thus generated corresponding accounting data in relation to, each received ATM cell.

21. An accounting system for an asynchronous transfer mode (ATM) network, said ATM network carrying asynchronous transfer mode (ATM) cells over a selected one of plural routes from a transmitting terminal to a receiving terminal and the ATM cells containing, respectively and selectively, plural, different types of information, the accounting system comprising:

first means for receiving the ATM cells carried by the ATM network and generating a cell received signal corresponding to each said received ATM cell, each received ATM cell having a virtual channel identifier (VCI) field, a first field and a second field, the VCI field having an associated VCI value indicative of the selected route over which the received ATM cell has been carried by the ATM network to the receiving terminal, the first field having information, the second field having information type data indicative of a medium type of the information contained therein, and the first means, further, detecting from each received ATM cell the respective VCI value and the respective information type data;

second means for storing a plurality of accounting coefficients, respectively corresponding to the plural, different types of information, the second means being coupled to the first means and responsive to the information type data detected by the first means, for each received ATM cell, for outputting the respectively corresponding accounting coefficient; and third means, coupled to said first and second means and responsive to the cell received signal, the detected VCI value and the accounting coefficient, as respectively output thereby for each received ATM cell, for generating corresponding accounting data, for storing the thus generated corresponding accounting data in relation to, each received ATM cell.

22. An accounting system for a communication network, said communication network carrying fixed bit length cells over a selected one of plural routes from a transmitting terminal to a receiving terminal and the cells containing, respectively and selectively, plural, different types of information, the accounting system comprising:

first means for receiving the cells carried by the communication network and generating a cell received signal corresponding to each said received cell, each received cell having a control data field, a first field and a second field, the control data field having an associated control data value indicative of the selected route over which the received cell has been carried by the communication network to the receiving terminal, the first field having information, the second field having information type data indicative of a medium type of the information contained therein, and the first means, further, detecting from each received cell the respective control data value and the respective information type data;

second means for storing a plurality of accounting coefficients, respectively corresponding to the plural, different types of information, the second means being coupled to the first means and responsive to the information type data detected by the first means, for each received cell, for outputting the respectively corresponding accounting coefficient; and third means, coupled to said first and second means and responsive to the cell received signal, the detected control data value and the accounting coefficient, as respectively output thereby for each received cell, for generating corresponding accounting data for, and storing the thus generated corresponding accounting data in relation to, each received cell.

23. An accounting system for an asynchronous transfer mode (ATM) network carrying asynchronous transfer mode (ATM) cells from a transmitting terminal to a receiving terminal, said accounting system comprising:

first means for receiving said ATM cells carried by the ATM network, each of said ATM cells having a virtual channel identifier (VCI) with a VCI value indicative of a route to the receiving terminal, information and information type data indicative of a type of the information, said first means detecting the respective VCI and the respective information type data contained in each said received ATM cell and generating a cell received signal each time said first means receives one of said ATM cells;

second means, coupled to said first means, for outputting an accounting coefficient indicative of an accounting rate associated with each respective said received ATM cell based upon the respective information type data detected by said first means; and third means, coupled to said first and second means, for generating accounting data for each said ATM cell based upon the respective accounting coefficient and cell received signal and storing said accounting data based upon each said VCI value detected by said first means, wherein said third means comprises fourth means for generating a pulse signal each time said first means receives a predetermined number of successive ATM cells having the same VCI value as one another, fifth means, coupled to said fourth means, for multiplying said predetermined number of successive ATM cells by said accounting coefficient associated with said successive ATM cells upon receipt of each said pulse signal and, in response, generating corresponding multiplication signals, and sixth means, coupled to said fifth means, for generating a sum of said multiplication signals associated with said successive ATM cells having the same VCI value as one another for each said VCI value detected by said first means.

24. An accounting method for a communication network carrying fixed length cells, each cell having a first field, a second field and a third field, said accounting method comprising the steps of:

(a) detecting control data having an associated control data value indicative of a route to a receiving terminal contained in the third field and information type data contained in the second field, said information type data indicating a medium type of information contained in the first field;

(b) outputting an accounting coefficient indicating an accounting rate associated with each said cell based upon the information type data detected by said step (a) for each said cell;

(c) generating a cell received signal in response to receipt of each said cell; and (d) generating accounting data for each said cell based upon the respective accounting coefficient and associated cell received signal.

25. The accounting method as claimed in claim 24, further comprising the step of generating a sum of said accounting data associated with respective cells having the same control data value as one another for each said detected control data value.

26. An accounting method for a communication network, said accounting method comprising the steps of:

(a) detecting control data having an associated control data value indicative of a route to a receiving terminal and information type data contained in each of a plurality of fixed bit length cells, said information type data indicating a type of information contained in a respective one of said cells;

(b) outputting an accounting coefficient indicating an accounting rate associated with each said cell based upon the information type data detected by said step (a) for each said cell;

(c) generating a pulse signal each time a predetermined number of successive cells having the same control data value as one another is received;

(d) multiplying said predetermined number of successive cells by said accounting coefficient upon receipt of each said pulse signal and, in response, generating corresponding multiplication signals; and (e) generating a sum of said multiplication signals associated with said successive cells having the same control data value as one another for each detected control data value.

27. An accounting system for a communication network, said communication network carrying fixed bit length cells from a transmitting terminal to a receiving terminal and the cells containing information, the accounting system comprising:

first means, for receiving the cells carried by the communication network, each received cell having a first field and a second field, the first field having the information, the second field having information type data indicative of a medium type of the information, and for detecting from each received cell the information type data;

second means for storing a plurality of account values, respectively corresponding to the medium type of the information, the second means being coupled to the first means and responsive to the information type data detected by the first means, for each received cell, and for outputting the respectively corresponding account values; and third means, coupled to said first and second means, for generating account data based on the account value and the number of received cells.

28. A terminal device which sends network information to a network and handles a plurality of media, said terminal device comprising:

first means for converting information concerning the media into respective packets;

second means for detecting, for each packet, a medium type of the information contained therein; and third means for making the network information having a first field and a second field, the first field containing the packet, the second field containing the medium type, the third means sending the network information to the network.

* * * * *

UNITED STATES PATENT AND TRADEMARK OFFICE
CERTIFICATE OF CORRECTION

PATENT NO. : 5,623,405
DATED : Apr. 22, 1997
INVENTOR(S) : ISONO

It is certified that error appears in the above-indentified patent and that said Letters Patent is hereby corrected as shown below:

Col. 11, line 4 (Claim 15, line 9), change "cell," to --cells,--.

Signed and Sealed this

Twenty-sixth Day of August, 1997

Attest:

BRUCE LEHMAN

Attesting Officer

Commissioner of Patents and Trademarks